(12) United States Patent
Boffi et al.

(10) Patent No.: US 11,056,873 B2
(45) Date of Patent: Jul. 6, 2021

(54) CABLE TERMINATION SYSTEM, TERMINATION ASSEMBLY AND METHOD FOR INSTALLING SUCH A TERMINATION ASSEMBLY

(71) Applicant: PRYSMIAN S.p.A., Milan (IT)

(72) Inventors: Paolo Boffi, Milan (IT); Stefano Pogliani, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 16/611,382

(22) PCT Filed: May 11, 2017

(86) PCT No.: PCT/IB2017/052750
§ 371 (c)(1),
(2) Date: Nov. 6, 2019

(87) PCT Pub. No.: WO2018/207003
PCT Pub. Date: Nov. 15, 2018

(65) Prior Publication Data
US 2020/0169074 A1    May 28, 2020

(51) Int. Cl.
*H02G 15/184*  (2006.01)
*H02G 15/064*  (2006.01)
*H02G 1/12*    (2006.01)

(52) U.S. Cl.
CPC ............ *H02G 15/064* (2013.01); *H02G 1/12* (2013.01)

(58) Field of Classification Search
CPC .................................................. H02G 15/184
(Continued)

(56) References Cited

U.S. PATENT DOCUMENTS 4,383,131 A * 5/1983 Clabburn ............... H02G 15/10
156/49
4,487,994 A * 12/1984 Bahder ............... B29C 61/0616
156/49

(Continued)

FOREIGN PATENT DOCUMENTS

EP    0435569    *  7/1991
EP    2 639 264 A1    9/2013
(Continued)

OTHER PUBLICATIONS

International Search Report and Written Opinion dated Jan. 30, 2018 in PCT/IB2017/052750, 13 pages.

*Primary Examiner* — Chau N Nguyen
(74) *Attorney, Agent, or Firm* — Oblon, McClelland, Maier & Neustadt, L.L.P.

(57) ABSTRACT

The present invention relates to a cable termination system comprising: —a power cable sequentially comprising a first length of exposed outer semiconductive layer, a length of exposed insulating layer and a length of exposed electric conductor, —an electric field control element adapted to be arranged around a portion of said power cable, said electric field control element comprising: —first and second longitudinally spaced semiconducting electrodes; —a field grading layer longitudinally extending between the first and second semiconducting electrodes and in electric contact therewith; —an insulating layer surrounding the semiconducting electrodes and the field grading layer, —wherein the first semiconducting electrode is positioned across a first boundary between the first length of exposed outer semiconductive layer and the length of exposed insulating layer, —wherein said second semiconducting electrode (160) is electrically connected with said length of exposed electric (Continued)

conductor (20), —a tubular insulating body adapted to house said power cable and said electric field control element.

11 Claims, 8 Drawing Sheets

(58) Field of Classification Search
USPC .......................................................... 174/73.1
See application file for complete search history.

(56) References Cited

U.S. PATENT DOCUMENTS

| | | | | |
|---|---|---|---|---|
| 5,294,752 | A * | 3/1994 | Vallauri | ................ H02G 15/18 |
| | | | | 174/73.1 |
| 5,502,279 | A * | 3/1996 | Mirebeau | ............ H02G 15/103 |
| | | | | 174/73.1 |
| 7,728,227 | B2 * | 6/2010 | Portas | .................... H02G 15/18 |
| | | | | 174/73.1 |
| 2013/0075124 | A1 | 3/2013 | Li et al. | |
| 2013/0078836 | A1 | 3/2013 | Li et al. | |
| 2013/0081851 | A1 | 4/2013 | Li et al. | |
| 2014/0065420 | A1 | 3/2014 | Sonerud et al. | |
| 2014/0076624 | A1 * | 3/2014 | Bohlin | ................ H02G 15/064 |
| | | | | 174/40 R |
| 2014/0116746 | A1 | 5/2014 | Rapp et al. | |
| 2017/0244235 | A1 | 8/2017 | Fälth et al. | |

FOREIGN PATENT DOCUMENTS

| | | |
|---|---|---|
| WO | WO 2013/004748 A2 | 1/2013 |
| WO | WO 2016/026538 A1 | 2/2016 |
| WO | WO 2008/076058 A1 | 6/2018 |

* cited by examiner

CABLE TERMINATION SYSTEM, TERMINATION ASSEMBLY AND METHOD FOR INSTALLING SUCH A TERMINATION ASSEMBLY

BACKGROUND OF THE INVENTION

The present invention relates to a cable termination system, particular for high (HV) and extra high voltage (EHV) terminations of the fluid-filled type for outdoor use, exposed to air and possible polluting agents. The present invention relates also to a termination assembly and to a method for installing such a termination.

For the purposes of the present invention, with medium and high voltage it is generally meant voltages in a range from 10 kV to 300 kV and more. When the voltage is greater than 300 kV, the expression extra high voltage (EHV) can be used.

For the purposes of the present invention, by termination assembly for power cable it is intended a device suitable to connect an electric cable to a bare conductor, an overhead conductor for example. This termination assembly comprises electrical connecting means between the cable conductor and the bare conductor and electrical separation means between the outer surface of the cable and parts connected thereto, generally at ground potential, and the elements under tension, such as the bare conductor.

A termination assembly of this kind generally comprises:
 a tubular insulating body adapted to house a portion of the power cable, and
 an electric field control element, commonly named "stress member" intended to be fitted to the terminated power cable and which is arranged in a radially inner position with respect to the tubular insulating body.

Typically, a HV power cable includes one cable core usually formed by an electrically conductive metal conductor covered by an insulation system. The insulation system is sequentially formed by an inner semiconducting layer, an intermediate insulating layer, and an outer semiconducting layer. The insulation system is usually covered by an outer protective jacket which is the outermost layer of the cable.

Before assembly operations between termination assembly and cable, an end portion of the power cable is subjected to cut and peeling procedures so as to present, one adjacent to the other, a first length of exposed electric conductor, a second length of exposed insulating layer and then the power cable with the complete insulation system which comprises the exposed outer semiconductive layer.

Cable peeling procedures are really sensitive and have to be performed by skilled workers only. As described e.g. in US2016126688, the region of the transition between the semiconductive layer and the insulating layer should be void free (no air pockets). In fact, the presence of voids and consequently of possible entrapped air between the insulation layer and the stress member gives rise to the formation of partial discharges when the voltage stress exceeds the dielectric strength of air, said partial discharges harming the insulation layer and causing premature failure of the cable and/or the termination assembly.

In order to limit possible failures, once the outer semiconductive layer of the cable is cut and removed, the exposed insulating layer has to be treated for making the surface as smooth as possible allowing the electric field control element to follow the cable surface closely. Special tools (e.g. abrasive papers or cloths) are used for removing any type of roughness at the insulating surface or at the transition between the semiconductive layer and the insulating layer.

After the preparation of the cable is performed, the electric field control element is interference fitted over the power cable at the boundary between the exposed outer semiconductive layer and the exposed insulating layer; in particular, the electric field control element can be fitted over the prepared cable either by slipping it over or by pre-expanding it on a removable carrier tube.

Materials having field grading properties are known in the art, and are usually made from a polymeric material including a filler that is able to impart the desired field grading properties, such as $Al_2O_3$, $TiO_2$, $BaTiO_3$, $ZnO$, $SiC$, optionally admixed with carbon black. Field grading materials are disclosed, for example, in WO 2008/054308, WO 2008/07605, US 2006/0145119 and US 2014/0065420.

At the end of assembly operations between termination assembly and cable, the tubular insulating body is installed so as to surround the power cable and the stress member leaving outside at one end the portion of the exposed electric conductor that is intended to be connected with other part of the energy network.

The space between the cable with the stress member and the tubular insulating body is typically filled with a fluid, generally silicone oil if the stress cone is made with EPR material and polybutene compound if the stress cone is made with silicone rubber. Alternatively, the termination may be filled with SF6 gas, particularly in case a risk of leak is not expected to be critical. The tubular insulating body may be made of porcelain, or composite material, e.g. a glass fibre reinforced epoxy tube, preferably covered with an antitracking elastomeric housing.

The Applicant experienced that, in assembled configuration and under certain operating conditions, for example under unexpected voltage overload conditions, the electric field distribution in the interface region between the cable insulating layer and the insulating layer of the electric field control element can become not homogeneous. This condition may worsen when, for example, the cable insulation surface was not perfectly prepared during installation. A charge accumulation may be formed and can provoke a radial perforation in the cable and/or in the insulating layer of the electric field control element.

The likelihood of this type of failures increases as the voltage level increases, and it becomes more likely for EHV direct current systems at 320 kV or higher, more in particular around 525-600 kV and above.

SUMMARY OF THE INVENTION

At the present, since the so-called green energy production made by wind farms and photovoltaic fields is increasing, it has made necessary the building of terminations which may control extra high power directly in DC.

The Applicant has observed that a reduction of the concentration of the electric field lines between the exposed outer semiconductive layer and the exposed insulating layer through conventional stress member, such as those discussed before, may not be sufficient in high or extra high voltage DC applications.

The Applicant has also observed that one of the most common reasons of terminations failure is due to bad cable peeling operations during installation, which may provoke voids and entrapped air between the insulation layer and the stress member giving rise to the formation of electrical discharges.

The Applicant has faced the problem of having a termination provided with an electric field control element power cable capable of significantly controlling the electric field and space accumulation charge for HV or EHV so as to reduce the risk of insulating layer perforation.

The Applicant discovered that the use, in combination, of a field grading layer of material having a non-linear conductivity with semiconducting electrodes positioned at its end portions and around the cable insulating layer allows to homogeneously distribute the electrical field exiting after the boundary of the semiconductive layer.

The Applicant has therefore found out that by making an electric field control element provided with semiconducting electrodes and with a field grading layer longitudinally extending between the two semiconducting electrodes and in electric contact therewith it can be possible to prevent undesired charge accumulation as well as high electric field inside the insulating layer.

Moreover, the combination of semiconducting electrodes and a field grading layer is able to simplify the peeling cable procedures during installation, minimizing possible errors attributable to workers or the like.

Therefore, according to a first aspect, the present invention relates to a cable termination system comprising:
 a power cable sequentially comprising a first length of exposed outer semiconductive layer, a length of exposed insulating layer and a length of exposed electric conductor,
 an electric field control element adapted to be arranged around a portion of said power cable, said electric field control element comprising:
  first and second longitudinally spaced semiconducting electrodes;
  a field grading layer longitudinally extending between the first and second semiconducting electrodes and in electric contact therewith;
  an insulating layer surrounding the semiconducting electrodes and the field grading layer,
  wherein the first semiconducting electrode is positioned across a first boundary between the first length of exposed outer semiconductive layer and the length of exposed insulating layer,
  wherein said second semiconducting electrode is electrically connected with said length of exposed electric conductor,
 a tubular insulating body adapted to house said power cable and said electric field control element.

For the purposes of the present invention, as "exposed layer of the power cable" it is meant that any further layer possibly arranged around such exposed layer have been removed, so that the exposed layer can be directly contacted from outside.

For the purposes of the present invention, as "field grading layer" it is meant a layer made of a material having a conductivity depending on the electrical gradient applied thereto. At low electrical gradient a field grading material behaves as an insulating material, while its conductivity increases with an increase of the electrical gradient.

The combination of semiconducting electrodes arranged as above and the field grading layer affords the due homogeneity of the electric field between the electric field control element and the cable insulating layer even at extreme high voltage direct current, such as up to voltages of 500-650 KV.

While the field grading layer controls the electric field, the semiconducting electrodes prevent the increasing of the electric gradient around the cable insulating layer, especially at the boundary with the cable outer semiconductive layer.

This prevents undesired charge accumulation in the cable insulating layer as well as high electric field inside the cable insulating layer. The risk of perforation is at least remarkably reduced. This enables to use silicone oil as insulating fluid into the insulating tubular body in alternative to SF6.

Preferably, the power cable sequentially comprises a first length of exposed outer semiconductive layer, a length of exposed insulating layer, a second length of exposed outer semiconductive layer and a length of exposed electric conductor, and the second semiconducting electrode is positioned across a second boundary between said second length of exposed outer semiconductive layer and said length of exposed insulating layer.

In this manner, the second length of exposed outer semiconductive layer provides the electrical connection between the electric conductor and said second semiconducting electrode. Advantageously, it is not necessary to remove the cable outer semiconducting layer up to the length of exposed electric conductor, thereby making the outer semiconducting layer removal, simpler, quicker and cheaper.

In the cable termination system, the electric conductor is electrically connected with said second semiconducting electrode.

Alternatively, the power cable sequentially comprises a first length of exposed outer semiconductive layer, a length of exposed insulating layer and a length of exposed electric conductor and a metallic mesh electrically connected to the second semiconducting electrode and the length of exposed electric conductor.

According to another aspect, the present invention relates to a termination assembly for a power cables comprising:
 an electric field control element adapted to be arranged around a portion of said power cable, the electric field control element comprising:
  first and second longitudinally spaced semiconducting electrodes;
  a field grading layer longitudinally extending between the two semiconducting electrodes and in electric contact therewith;
  an insulating layer surrounding the semiconducting electrodes, and the field grading layer,
 a tubular insulating body adapted to house said power cable and said electric field control element.

The two semiconducting electrodes are positioned and dimensioned so as to longitudinally protrude beyond the end portions of the electric field control element insulating layer.

Alternatively, the semiconducting electrodes are flush with the end portions of the electric field control element.

In an embodiment of the invention, the field grading layer is at least partially superposed over and partially embeds the semiconducting electrodes.

In particular, the field grading layer is radially interposed between the electric field control element insulating layer and the power cable insulating layer and the semiconducting electrodes.

This makes the electric field control element of the invention easy and simple to be manufactured being substantially free from complex geometries that inevitably cause difficulties in the production of the electric field control element and increase its cost.

According to another aspect, the present invention relates to a method for installing a termination assembly on a power cable comprising the steps of:
 providing a power cable comprising an electric conductor and an insulation system surrounding the electric conductor, said insulation system comprising an inner semiconducting layer, an insulating layer and an outer semiconducting layer;

removing a length of the outer semiconducting layer thereby leaving a length of exposed insulating layer so as to make at least a first boundary between the outer semiconducting layer and the exposed insulating layer;

fitting an electric field control element so that the semiconducting electrode, which is distal with respect to the exposed electric conductor, be positioned across the first boundary in direct contact with the corresponding outer semiconductive layer;

electrically connecting the electric conductor with the semiconducting electrode, which is proximal with respect to the electric conductor.

In one embodiment, the power cable electric conductor is electrically connected with the proximal semiconducting electrode by means of a metallic mesh.

Alternatively, the length of the exposed electric conductor is separated from the length exposed insulating layer by a second length of outer semiconducting layer so as to make a second boundary between the second length of outer semiconducting layer and the exposed insulating layer, the proximal semiconducting electrode being positioned across the second boundary cross-section in direct contact with the second length of outer semiconducting layer, the electric conductor being electrically connected with the second length of outer semiconductive layer.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the invention. This is done merely for convenience and to give a general sense of the invention. This description should be read to include one or at least one, and the singular also includes the plural unless it is obvious that it is meant otherwise.

As "insulating layer" it is meant a layer made of a material having a conductivity comprised between $10^{-16}$ and $10^{-14}$ S/m.

As "semiconducting layer" it is meant a layer made of a material having a conductivity comprised between $10^{-1}$ and 10 S/m.

Advantageously, a field grading material has a conductivity substantially equal to that of an insulating layer, for example comprised between $10^{-16}$ and $10^{-14}$ S/m, at low electrical gradient, for example up to 4-5 kV/mm, and increases, linearly or stepwise, for example to $10^{-11}$-$10^{-8}$ S/m at an electrical gradient higher than 8-10 kV/mm.

BRIEF DESCRIPTION OF THE DRAWINGS

Further characteristics will be apparent from the detailed description given hereinafter with reference to the accompanying drawings, in which.

DETAILED DESCRIPTION OF THE PREFERRED EMBODIMENTS

Figure 1:
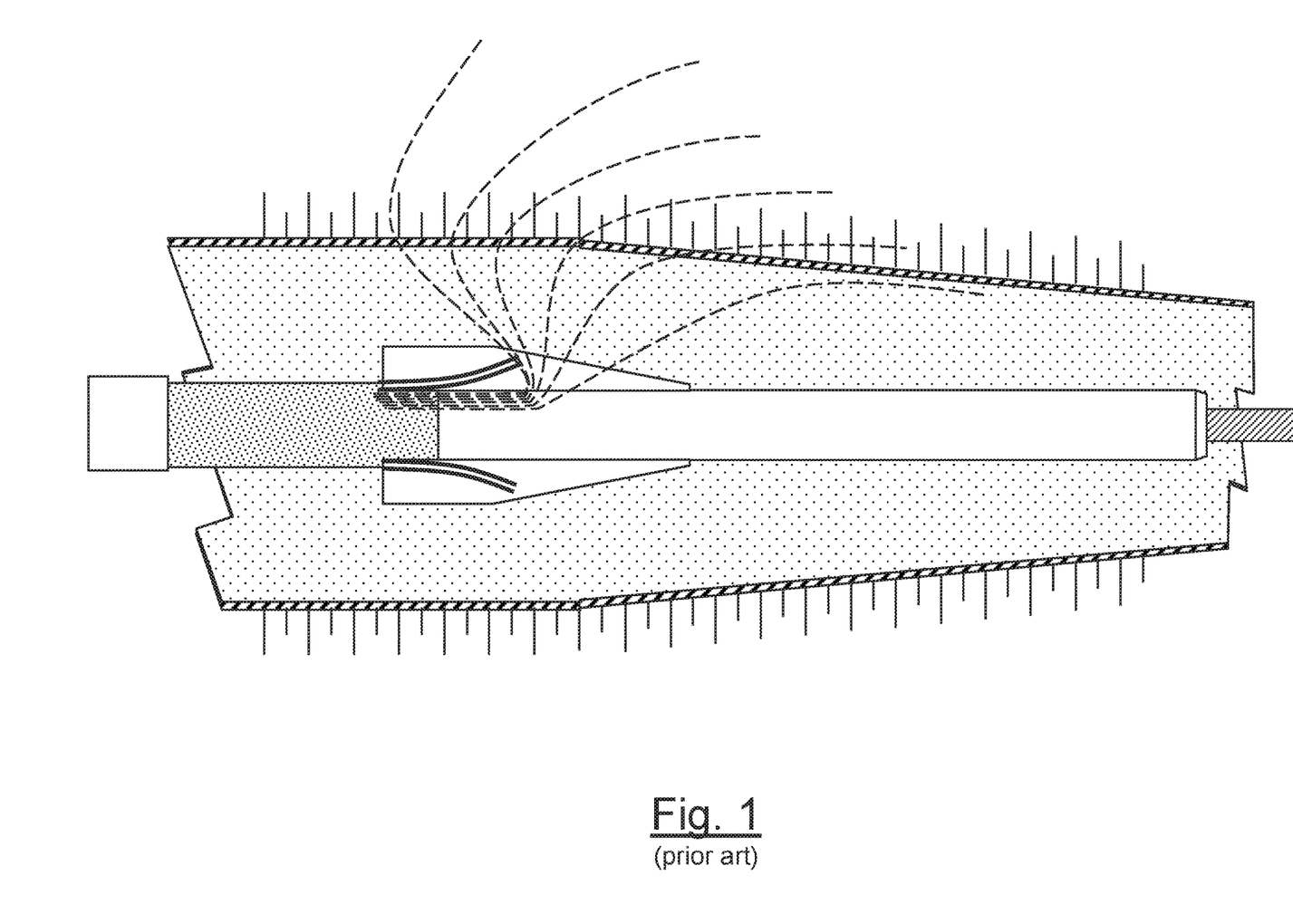
FIG. 1 is a schematic cross-sectional side view of the terminal according to the prior art in an assembled configuration with one power cable; some electric field lines are also shown in dashed lines.
Figure 2:
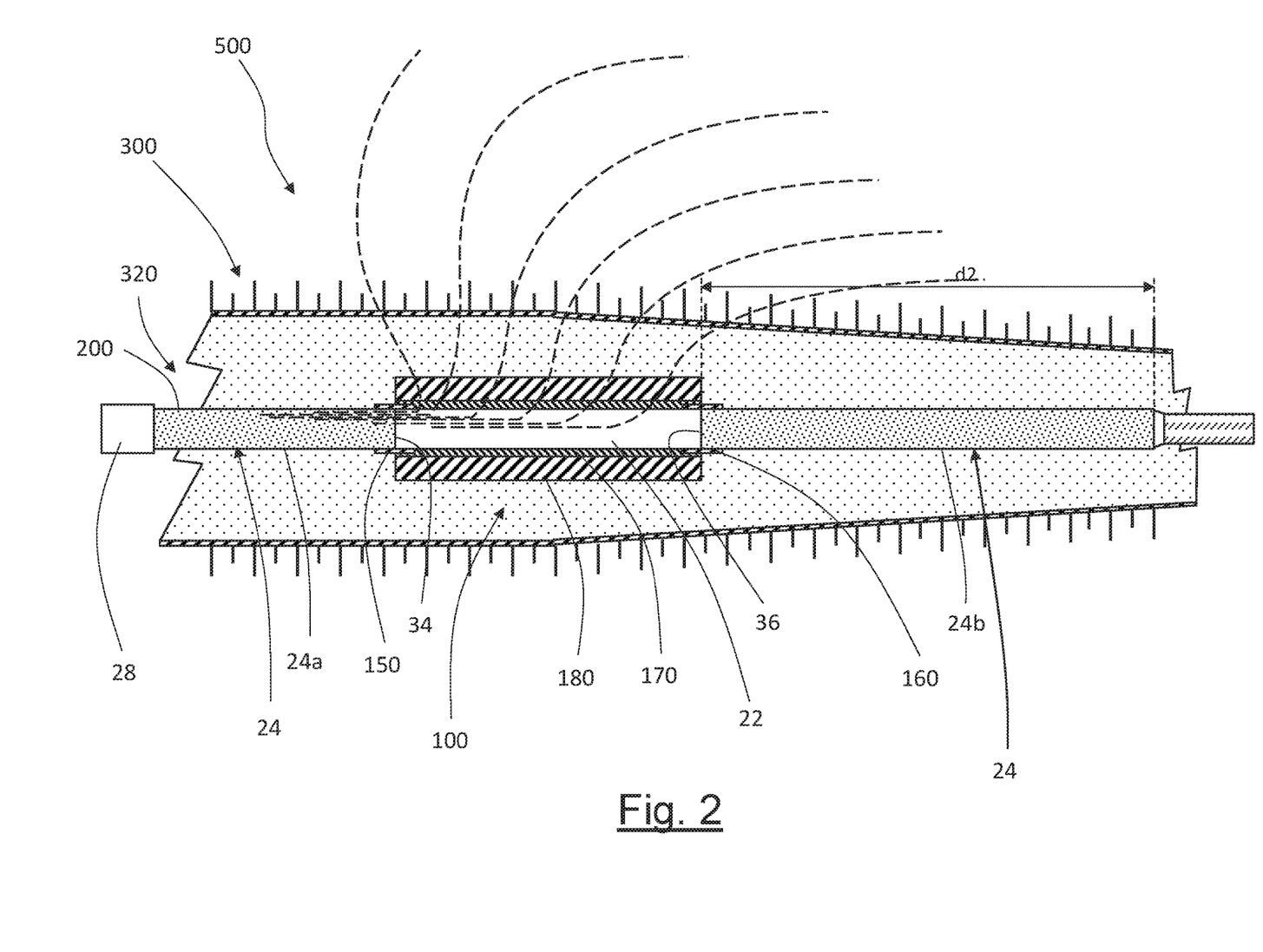
FIG. 2 is a schematic cross-sectional side view of the terminal according to the present invention in an assembled configuration with one power cable; some electric field lines are also shown in dashed lines.
Figure 3:
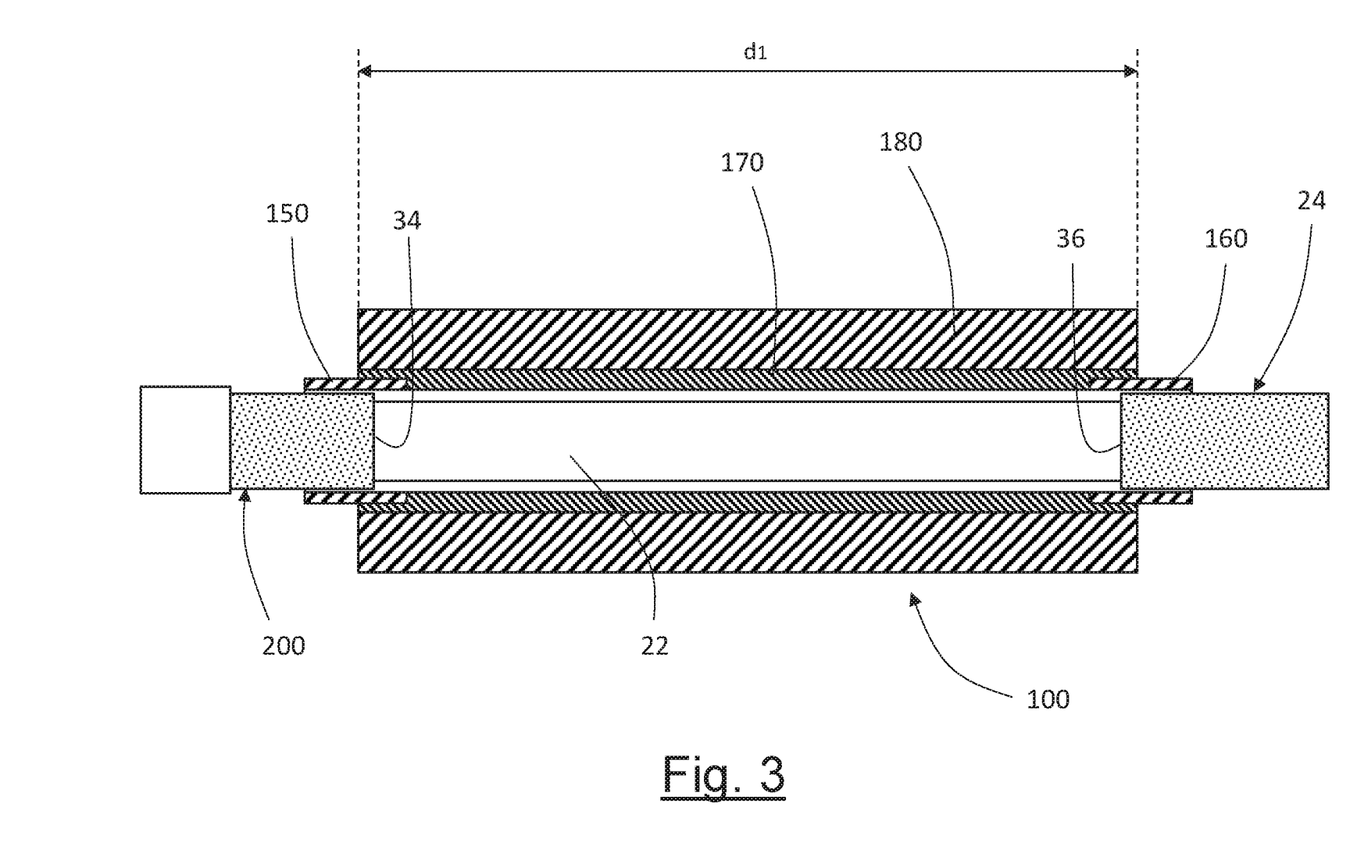
FIG. 3 is a schematic cross-sectional side view of the electric field control element of the terminal of FIG. 2 in an assembled configuration with one power cable.

A terminal 500 for high voltage power cables according to the present invention is shown in FIG. 2.

In particular, FIG. 2 shows a terminal 500 according to the invention assembled on a HV or EHV power cable 200 which comprises an electric conducting core 20 and a cable insulation system surrounding the electric conducting core 20. The cable insulation system comprises a cable inner semiconductive layer (not illustrated) surrounding and in contact with the electric conducting core 20, a cable insulating layer 22, surrounding and in contact with the respective inner semiconductive layer, and a cable outer semiconductive layer 24, surrounding and in contact with the respective insulating layer 22. Around to the outer semiconductive layer 24 an outer protective sheath 28 is provided which is considered the outermost layer of the cable 200.

For the purposes of the present invention, since the installation of the terminal 500 requires the cutting and the removal of the outer sheath 28 at the power cable portion intended to be coupled to the terminal 500, in the following, the term "power cable" will refers to the electric conductor 20 surrounded by the insulation system without the outer sheath 28.

As shown in FIG. 2, the terminal 500 comprises a tubular insulating body 300 and an electric field control element 100. The tubular insulating body 300 extends along a longitudinal direction X between two opposite end portions 310, 320 and is adapted to house a portion of the power cable 200. Such a tubular insulating body 300 is further provided of a corona shield at the end portion 310 which is intended to be in a higher position with respect to the other in the assembled configuration.

The electric field control element 100 extends along the longitudinal direction X between two opposite end portions 110, 120 and is intended to be arranged in a radially inner position with respect to the tubular insulating body between the two opposite end portions 110, 120. The electric field control element 100 comprises two semiconducting electrodes 150, 160, which, in the embodiment of FIGS. 2-5, are positioned and dimensioned so as to longitudinally protrude beyond the end portions 110, 120 of the electric field control element insulating layer 100. This configuration of the semiconducting electrodes eases the handling of the electric field control element during its installation around the power cables.

Figure 6:
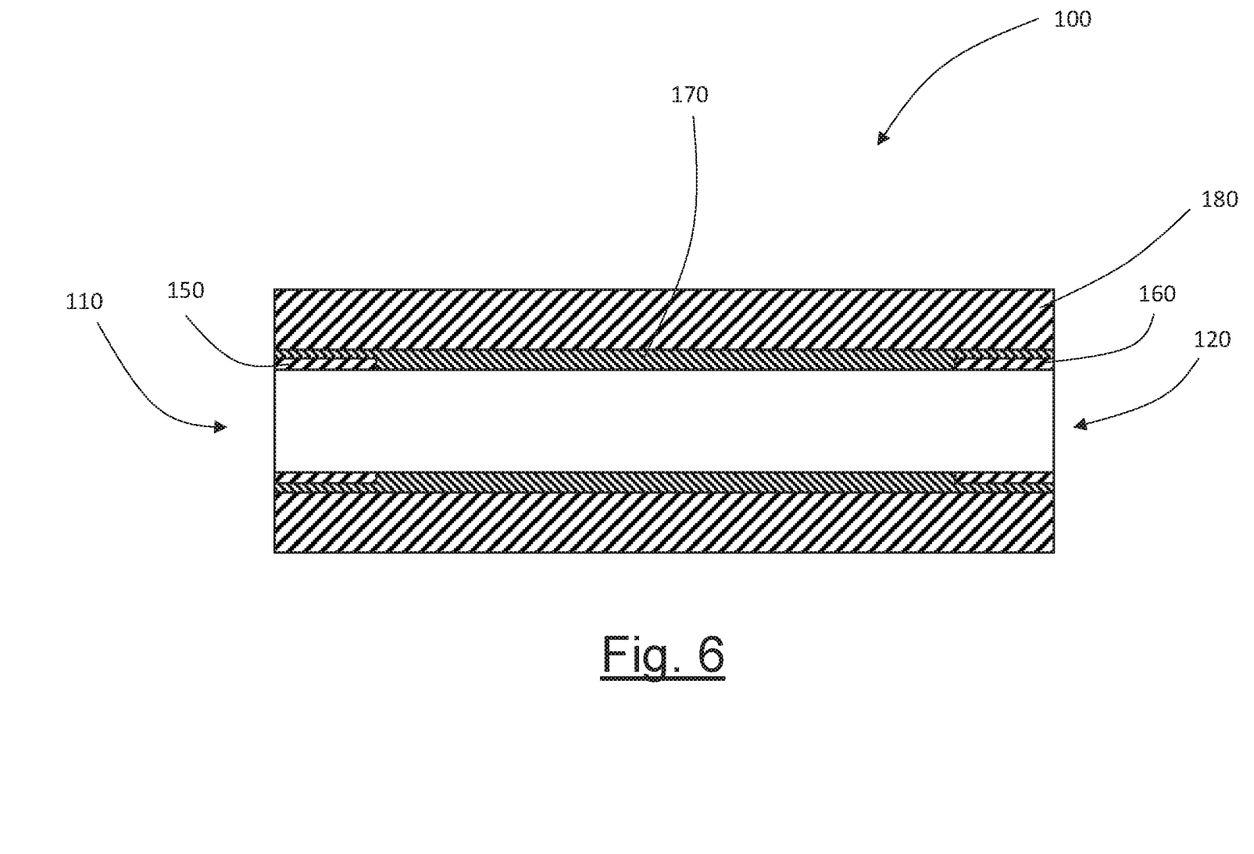
FIG. 6 is a schematic cross-sectional side view of another embodiment of the electric field control element of the terminal according to the present invention.
Figure 7:
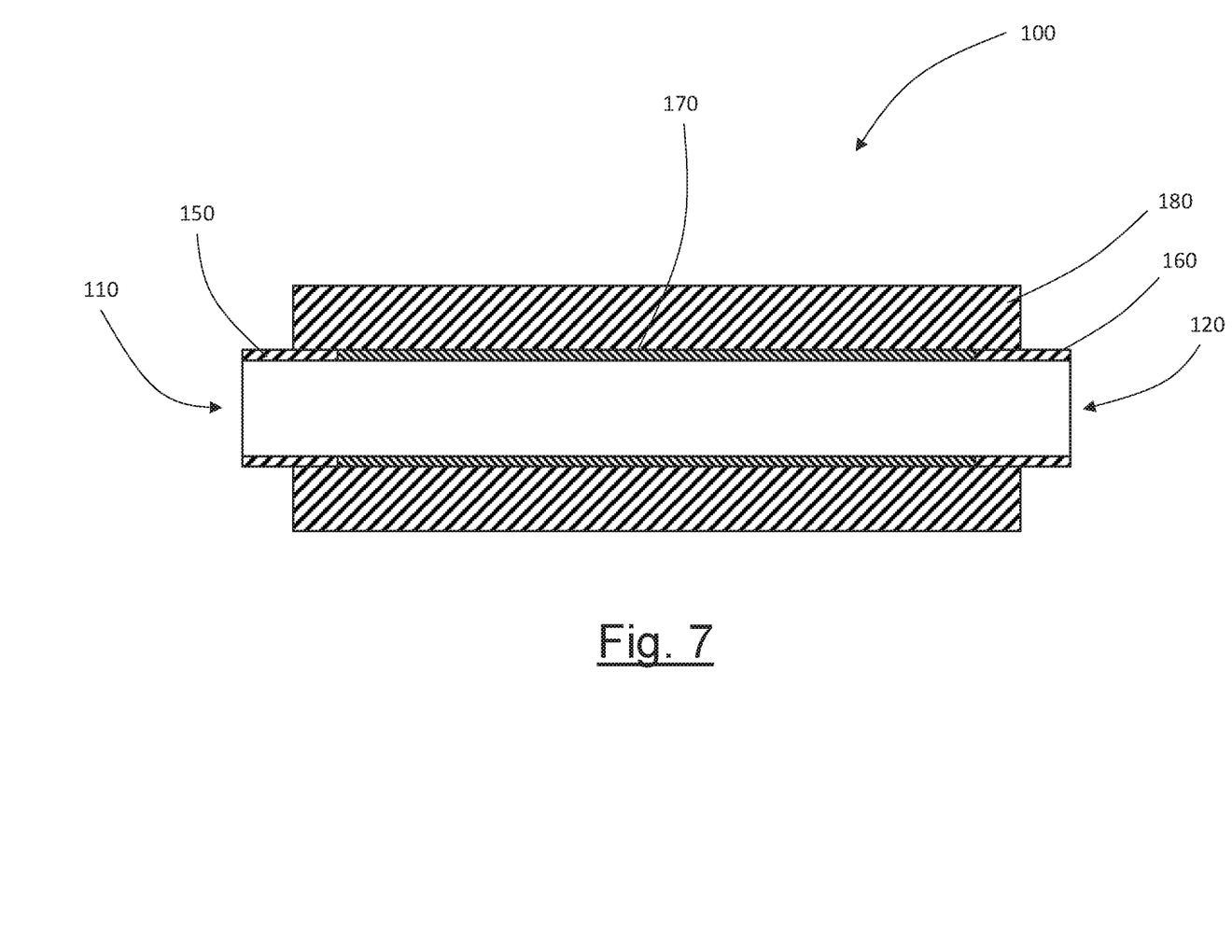
FIG. 7 is a schematic cross-sectional side view of a further embodiment of the electric field control element of the terminal according to the present invention.

Alternatively, as shown in FIG. 6, the two semiconducting electrodes 150, 160 are flush with the end portions 110, 120 of the electric field control element 100.

Figure 4:
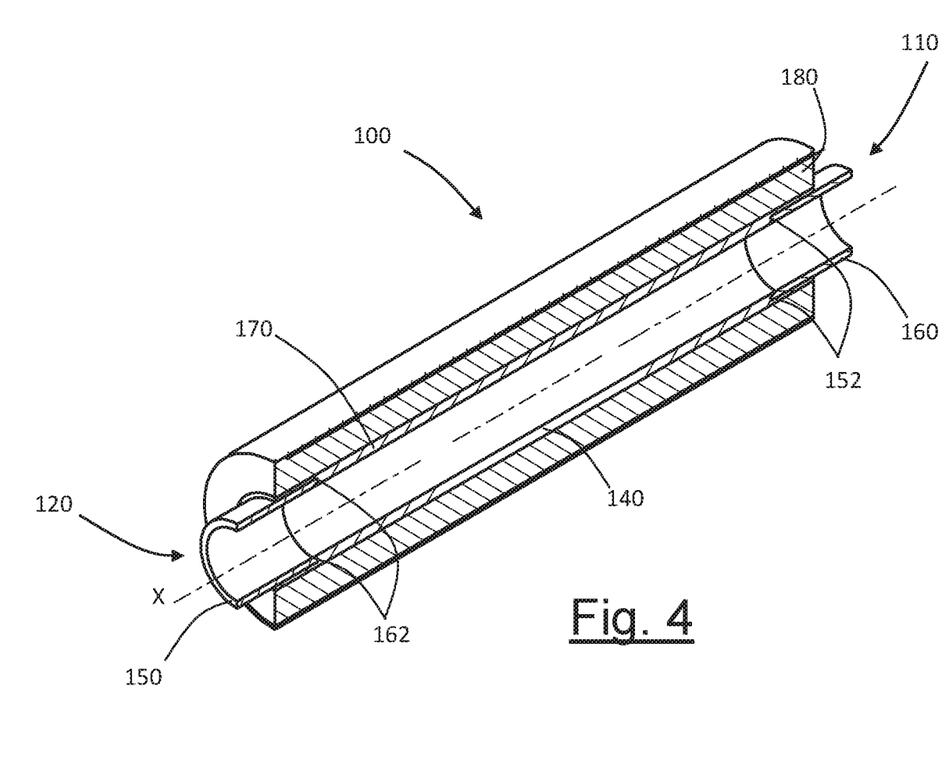
FIG. 4 is a schematic cross-sectional perspective view of the electric field control element of FIG. 3.
Figure 5:
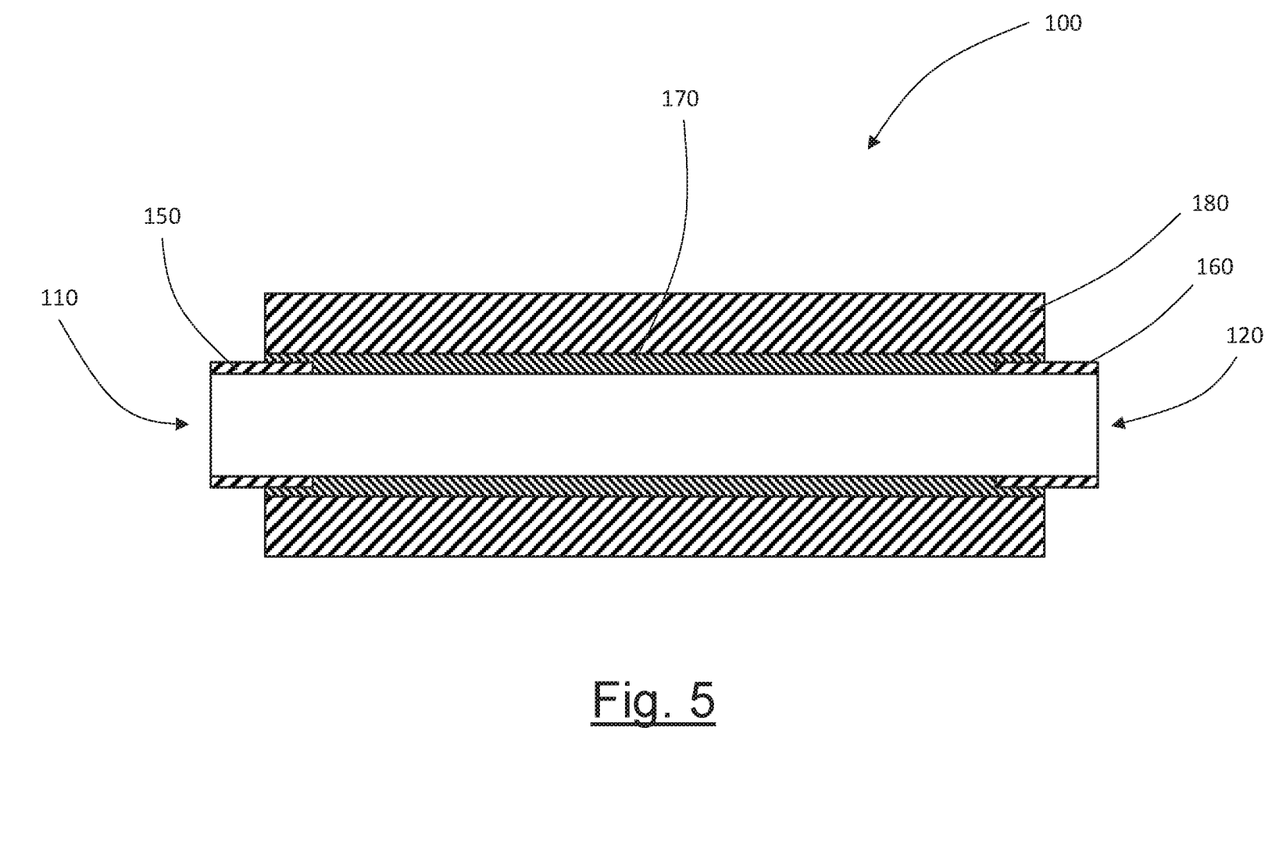
FIG. 5 is a schematic cross-sectional side view of the electric field control element of FIG. 4.

As it can be observed in FIG. 4, the extremities 152, 162 of the two semiconducting electrodes 150, 160 facing towards the inside of the electric field control element 100 are chamfered without tips in order to reduce the risk of charge accumulation.

The electric field control element 100 comprises also a field grading layer 170 longitudinally extending between the two semiconducting electrodes 150, 160 and in electric contact therewith.

In particular, the field grading layer 170 can be at least partially superposed over and partially embeds the semiconducting electrodes 150, 160, like in the embodiment of FIGS. 3-6, wherein the field grading layer 170 longitudinally extends to partially cover and partially embed the two semiconducting electrodes 150, 160. The field grading layer 170, in fact, partially overlaps the radially external surface of the two semiconducting electrodes 150, 160 and embeds their longitudinal end facing the inside of the electric field control element 100. In particular, the material of the field grading layer 170 intrudes around chamfered ends 152, 162 of the two semiconducting electrodes 150, 160.

The electric field control element 100 further comprises an insulating layer 180 surrounding the semiconducting electrodes 150, 160, and the field grading layer 170.

In the embodiment of the FIGS. 2-6, the field grading layer 170 longitudinally extends so as to be interposed between the insulating layer 180 and the semiconducting electrodes 150, 160. In this case, the insulating layer 180 overlaps the field grading layer 170 so as to be positioned radially external thereto.

Alternatively, the field grading layer 170 may longitudinally extend just between the semiconducting electrodes 150, 160 being not superposed thereto. In this alternative embodiment, the insulating layer 180 overlaps the field grading layer 170 and the semiconducting electrodes 150, 160.

The thickness of the layers of the electric field control element 100 can be selected in view of the voltage of the cables to be connected and of the specific materials used for the electric field control element 100 itself, according to the skilled person experience. For example, the electric field control element 100 for cables designed to transport 500 kV can have semiconducting electrodes 150, 160 from 6 to 12 mm thick, field grading layer from 9 to 16 mm thick and an insulating layer from 30 to 60 mm thick.

Preferably, the length of an electric field control element 100 for a 525 kV class termination is comprised between 650 mm and 700 mm. More preferably, the length of an electric field control element 100 for a 525 kV class termination is 687 mm.

Preferably, the length of an electric field control element 100 for a 640 kV class termination is comprised between 800 mm and 900 mm. More preferably, the length of an electric field control element 100 for a 640 kV class termination is about 842 mm.

The method for installing the terminal 300 on the high voltage power cable 200, according to the present invention, will be described in the following.

First of all, the power cable 200 is subjected to peeling operations in order to adapt it to the application of the terminal 300. In this regard, the installation method provides the step of removing a length of the outer sheath 28 at an end of the power cable 200 thereby leaving a corresponding length of exposed insulation system.

The insulation system is then peeled providing the step of removing a length of the outer semiconducting layer 24 thereby leaving a length of exposed insulating layer 22. In particular, the length of exposed insulating layer 22 is exposed between two portions of the outer semiconducting layer 24 so formed. The first portions 24a of the outer semiconducting layer 24 is the portion adjacent to the outer protective sheath 28, whilst the second portions 24b of the outer semiconducting layer 24 is the portion adjacent to the exposed electrical conductor 20. A first boundary 34 is formed between the power cable with the exposed outer semiconductive layer portion 24a and the length of exposed insulating layer 22. A second boundary 36 is formed between the exposed outer semiconductive layer portion 24b and the exposed insulating layer 22.

The above cable peeling steps may be done indifferently one before the other or vice versa.

The second portions 24b of the outer semiconducting layer 24 has a length $d_2$ comprised between 1700 mm and 2000 mm, more preferably, of about 1890 mm.

After the cable peeling steps, the method provides the step of fitting the electric field control element 100 on the power cable 200 so that the semiconducting electrode 150, which is distal with respect to the length of exposed electric conductor 20, be positioned across the first boundary 34 in direct contact with the corresponding outer semiconductive layer portion 24a.

Then, the semiconducting electrode 160, which is proximal with respect to the length of exposed electric conductor 20, is electrically connected to the cable electric conductor 20. In this way the two semiconducting electrodes 150, 160 are subjected to the same voltage of the power cable 200 (i.e., the voltage between the two semiconducting electrodes 150, 160 is the same as the voltage of the power cable 200). Under this operational condition, the field grading layer permits to control the electric field lines at the first boundary 34 so as to homogeneously distribute them.

The length of exposed insulating layer 22 can be adjacent to the end length of exposed electric conductor 20. In this case the power cable electric conductor 20 can be electrically connected with the proximal semiconducting electrode 160 by means of a metallic mesh.

Figure 8:
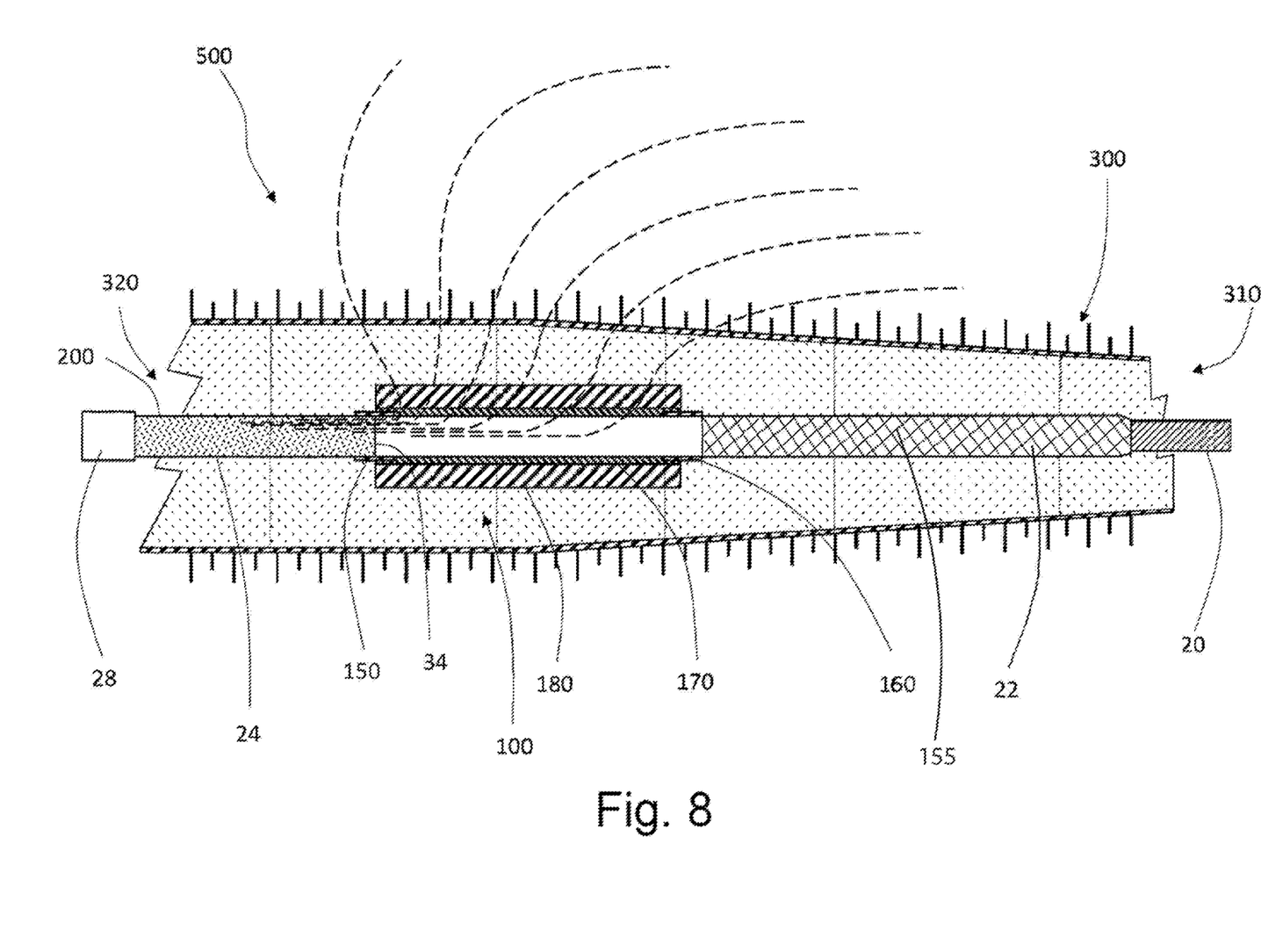
FIG. 8 is a schematic cross-sectional side view of the terminal of FIG. 2 according to another embodiment of the invention.

As shown in the embodiment of FIG. 8, the insulation system can be peeled providing the step of removing a length of the outer semiconducting layer 24 thereby leaving a length of exposed insulating layer 22 up to the exposed electric conductor 20. In this regard, the electric field control element 100 is fitted on the power cable 200 so that the proximal semiconducting electrode 160 be in direct contact with the exposed insulating layer 22. The electric conductor 20 can be electrically connected with the proximal semiconducting electrode 160 (e.g., by a mesh or sock 155) providing that the distal semiconducting electrode 150 be equipotential with respect to the outer semiconductive layer 24 adjacent to the outer protective sheath 28.

Once the electric field control element 100 is fitted on the power cable 200, the insulating tubular body is coupled to such a power cable 200 so as to internally house the portion of the power cable 200 at which the electric field control element 100 is fitted. The application of the insulating tubular body is carried out according to known procedures. Then the space inside the insulating tubular body is filled with an insulating fluid, which can be a silicon oil.

The invention claimed is:

1. A cable termination system comprising:
   a power cable sequentially comprising a first length of exposed outer semiconductive layer, a length of exposed insulating layer and a length of exposed electric conductor;
   an electric field control element adapted to be arranged around a portion of said power cable, said electric field control element comprising:
      first and second longitudinally spaced semiconducting electrodes;
      a field grading layer longitudinally extending between said first and second semiconducting electrodes and in electric contact therewith;
      a metallic element disposed between the second semiconducting electrode and the length of exposed electric conductor; and
      an insulating layer surrounding the semiconducting electrodes and the field grading layer,
      wherein said first semiconducting electrode is positioned across a first boundary between said first length of exposed outer semiconductive layer and said length of exposed insulating layer, and
      wherein said second semiconducting electrode is electrically connected with said length of exposed electric conductor via the metallic element; and
   a tubular insulating body adapted to house said power cable and said electric field control element.

2. The cable termination system according to claim 1, wherein said power cable also comprises a second length of exposed outer semiconductive layer, said second semiconducting electrode being positioned across a second boundary formed between said second length of exposed outer semiconductive layer and said length of exposed insulating layer.

3. The cable termination system according to claim 2, wherein said electrical conductor is electrically connected with said second semiconducting electrode.

4. The cable termination system according to claim 3, wherein said electrical conductor is electrically connected with said second semiconducting electrode by said second length of exposed outer semiconductive layer.

5. The cable termination system according to claim 1, wherein the metallic element is a metallic mesh or sock.

6. A termination assembly for a power cable comprising:
   an electric field control element adapted to be arranged around a portion of said power cable, the electric field control element comprising:
      first and second longitudinally spaced semiconducting electrodes;
      a field grading layer longitudinally extending between said semiconducting electrodes and in electric contact therewith;
      a metallic element configured to provide an electric connection between the second semiconducting electrode and an electric conductor of the power cable; and
      an insulating layer surrounding the semiconducting electrodes and the field grading layer; and
   a tubular insulating body adapted to house said power cable and said electric field control element.

7. The termination assembly according to claim 6, wherein the semiconducting electrodes are positioned and dimensioned so as to longitudinally protrude beyond the ends of the electric field control element.

8. The termination assembly according to claim 6, wherein the two semiconducting electrodes are flush with the ends of the electric field control element.

9. The termination assembly according to claim 6, wherein the field grading layer is at least partially superposed over and partially embeds the semiconducting electrodes.

10. A method for installing a termination assembly on a high voltage power cable, the method comprising:
    providing a power cable comprising an electric conductor and an insulation system surrounding the electric conductor, said insulation system comprising an inner semiconducting layer, an insulating layer and an outer semiconducting layer;
    removing a length of the outer semiconducting layer so as to create a first length of exposed outer semiconducting layer thereby leaving a length of exposed insulating layer making at least a first boundary there between;
    removing a length of the insulation system thereby leaving a length of exposed electric conductor;
    fitting an electric field control element according to claim 6, so that the first semiconducting electrode, which is distal with respect to the exposed electric conductor, be positioned across the first boundary cross-section in direct contact with the corresponding outer semiconductive layer; and
    electrically connecting the electric conductor with the second semiconducting electrode, which is proximal with respect to the electric conductor, via the metallic element that is disposed between the electric conductor and the second semiconducting electrode.

11. The method according to claim 10, wherein the length of the exposed electric conductor is separated from the length exposed insulating layer by a second length of outer semiconducting layer so as to make a second boundary between the second length of outer semiconducting, layer and the exposed insulating layer, the second semiconducting electrode being positioned across the second boundary cross-section in direct contact with the second length of outer semiconducting layer, the electric conductor being electrically connected with the second length of outer semiconductive layer.

* * * * *